United States Patent
Unru et al.

(10) Patent No.: US 12,470,153 B2
(45) Date of Patent: Nov. 11, 2025

(54) METHOD FOR EXTENDING A VOLTAGE RANGE OF A RECTIFIER, RECTIFIER FOR CARRYING OUT THE METHOD, AND ELECTROLYSIS SYSTEM

(71) Applicant: SMA Solar Technology AG, Niestetal (DE)

(72) Inventors: Alexander Unru, Baunatal (DE); Andreas Falk, Kassel (DE); Dirk Hermeling, Petershagen (DE); Ralf Juchem, Felsberg (DE); Marcel Kratochvil, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 384 days.

(21) Appl. No.: 17/975,945

(22) Filed: Oct. 28, 2022

(65) Prior Publication Data
US 2023/0050530 A1    Feb. 16, 2023

Related U.S. Application Data

(63) Continuation of application No. PCT/EP2021/059560, filed on Apr. 13, 2021.

(30) Foreign Application Priority Data

Apr. 28, 2020  (DE) .................... 10 2020 111 556.3

(51) Int. Cl.
*H02M 7/219* (2006.01)
*C25B 1/04* (2021.01)
(Continued)

(52) U.S. Cl.
CPC ............... *H02M 7/219* (2013.01); *C25B 9/65* (2021.01); *H02M 1/0016* (2021.05); *C25B 1/04* (2013.01)

(58) Field of Classification Search
None
See application file for complete search history.

(56) References Cited

U.S. PATENT DOCUMENTS 10,484,717 B2  11/2019  Ye et al.
11,165,253 B2  11/2021  Fujisawa et al.
(Continued)

FOREIGN PATENT DOCUMENTS

DE       10303710 A1    8/2004
DE    102014002348 A1    8/2015
(Continued)

OTHER PUBLICATIONS

International Search Report dated Jul. 8, 2021 in connection with PCT/EP2021/059560.

*Primary Examiner* — Harry D Wilkins, III
(74) *Attorney, Agent, or Firm* — Eschweiler & Potashnik, LLC

(57) ABSTRACT

A method and related apparatus for extending a DC voltage range of a rectifier circuit for the supply, from an AC grid, of a DC load which is connected to a DC rectifier output of the rectifier circuit, wherein an AC rectifier input of the rectifier circuit is connected via a grid connection point to the AC grid, wherein the rectifier circuit includes an AC/DC converter having an AC input and a DC output, wherein the AC/DC converter includes a converter circuit having semiconductor switches and freewheeling diodes connected in an antiparallel arrangement thereto, wherein an inductance is connected between the AC input of the AC/DC converter and the grid connection point. The method includes setting a desired DC operating voltage $U_{DOC,soll}$ on the DC output of the AC/DC converter or on the DC rectifier output, or both, by an actuation of semiconductor switches of the AC/DC converter, wherein, when the desired DC operating voltage $U_{DC,soll}$ lies below a value of an amplitude $Û_4$ of an (Continued)

alternating voltage on the AC input of the AC/DC converter, the semiconductor switches of the AC/DC converter are actuated for an exchange of reactive power $Q_1(t)$ with the AC grid, which has a voltage-lowering effect upon the amplitude $\hat{U}_4$ of the AC voltage at the AC input of the AC/DC converter, such that the amplitude $\hat{U}_4$ approaches the desired DC operating voltage $U_{DC,soll}$, and wherein the exchange of the reactive power $Q_1(t)$ with the AC grid is executed during or shortly before an electrical connection or an electrical isolation of the DC load to or from the rectifier circuit.

20 Claims, 3 Drawing Sheets

(51) Int. Cl.
  *C25B 9/65* (2021.01)
  *H02M 1/00* (2007.01)

(56) References Cited

U.S. PATENT DOCUMENTS

| | | | |
|---|---|---|---|
| 2006/0114642 A1 | 6/2006 | Liu et al. | |
| 2015/0333655 A1* | 11/2015 | Arai | H02M 7/217 363/89 |
| 2018/0191407 A1 | 7/2018 | Zhang et al. | |
| 2021/0363651 A1 | 11/2021 | Seymour et al. | |

FOREIGN PATENT DOCUMENTS

| | | |
|---|---|---|
| JP | 2001047894 A | 2/2001 |
| JP | 2018183035 A | 11/2018 |
| WO | 2013160486 A1 | 10/2013 |
| WO | 2014011595 A1 | 1/2014 |
| WO | 2018025307 A1 | 2/2018 |
| WO | 2019246433 A1 | 12/2019 |

* cited by examiner

METHOD FOR EXTENDING A VOLTAGE RANGE OF A RECTIFIER, RECTIFIER FOR CARRYING OUT THE METHOD, AND ELECTROLYSIS SYSTEM

CROSS REFERENCE TO RELATED APPLICATIONS

This application is a continuation of International Patent Application Number PCT/EP2021/059560, filed on Apr. 13, 2021, which claims priority to German Patent Application number 10 2020 111 556.3, filed on Apr. 28, 2020, and is hereby incorporated by reference in its entirety.

FIELD

The disclosure relates to a method for extending a DC voltage range of a rectifier, a rectifier for executing the method, and an electrolysis system having such a rectifier.

BACKGROUND

Hydrogen can be produced by an electrolysis reaction, wherein water is broken down into its constituents, hydrogen and oxygen, in an electrolyzer. A speed of the electrolysis reaction is set by a DC voltage, which is applied at an input of the electrolyzer. The DC voltage is customarily generated by a rectifier, which is connected on the input side to an alternative voltage (AC) grid and, on the output side, to a DC load in the form of the electrolyzer. In many cases, an actively-controlled single-stage rectifier is employed as a rectifier. A converter circuit of an AC/DC converter which is assigned to the rectifier comprises a number of semiconductor switches, each comprising a freewheeling diode which is connected to the respective semiconductor switch in an antiparallel arrangement. As a result of the antiparallel-connected freewheeling diodes, a minimum DC voltage on the DC output of the AC/DC converter is limited to the value of an amplitude of an alternating voltage which is applied to the input side of the AC/DC converter. In other words, the minimum DC voltage on the DC output of the AC/DC converter corresponds to the amplitude of the input-side alternating voltage applied to the AC/DC converter. This applies in the event of an at least predominantly capacitive DC load on the DC output of the AC/DC converter, which executes a smoothing action on the DC voltage, such that any voltage ripple on the DC output is negligible. As the ohmic component of the DC load rises, voltage ripple on the DC output of the AC/DC converter becomes more pronounced, and the minimum DC voltage is displaced to slightly smaller values. In this case, it is customarily sufficient for the minimum DC voltage on the DC output to be described by the "average rectified value". The average rectified value corresponds to the arithmetical mean of the rectified DC voltage, and is dependent upon the respective topology of the rectifier employed, particularly the AC/DC converter thereof.

Conventional electrolyzers are customarily characterized by a current-voltage characteristic curve (I-U curve). The I-U curve can be divided into two regions. Where DC voltages present on the input of the electrolyzer lie below a critical voltage $U_{cr}$, no electrolysis reaction will yet be in progress, and there will thus be no stationary current flow. Instead, the electrolyzer shows a predominantly capacitive response, which is associated with the constitution of double layers in the electrolysis cells. Only when the critical voltage $U_{cr}$ is exceeded is an electrolysis reaction established, the speed of which increases as the DC voltage rises. In this region, a stationary current flows, which drives the electrolysis reaction, and the electrolyzer behaves predominantly here as an ohmic load. The maximum permissible DC voltage $U_{DC,max}$ is limited by a rated capacity or component properties of the electrolyzer. Values for the critical voltage $U_{cr}$ and the maximum permissible DC voltage $U_{DC,max}$ are dependent upon the design of the electrolyzer and, in consequence, are customarily variable from type to type.

In general, it is desirable that the electrolyzer, by means of the rectifier, should be steplessly adjustable and operable over the entire operating range for the DC voltage applied at the input, but a least in a range extending from slightly below the critical voltage $U_{cr}$ up to the maximum permissible DC voltage $U_{DC,max}$. Additionally, it is desirable that high reaction speeds, and thus associated high DC voltages, should be generated at the input of the electrolyzer, with the minimum possible conversion losses on the rectifier. In single-stage rectifiers, in order to permit the generation of only a DC voltage on the DC rectifier output which is below the critical voltage $U_{cr}$, the amplitude of the alternating voltage on the AC input of the converter circuit can be adjusted to a correspondingly low value, for example by means of a transformer. However, this results in high conversion losses in the event that, during the operation of the electrolyzer, high DC voltages are required on the DC rectifier output.

From the prior art, for example from document WO 2013 160486 A2, a method is known for voltage correction at a node point of an AC grid, via which a regenerative generating installation is connected to said AC grid. In the event of a deviation in the amplitude of the alternating voltage from its designated nominal value, reactive power is exchanged between the regenerative generating installation and the AC grid. Reactive power thus exchanged counteracts the deviation in a manner which supports the grid system, with the objective of minimizing the deviation.

Document DE 103 03 710 A1 discloses a method for regulating a self-commutated line converter having a DC voltage output, in the event of a line overvoltage. In this method, according to the value of a line overvoltage thus determined, a target value for a reactive component of a line current is defined, which reduces an actual value of a duty cycle for the self-commutated line converter.

SUMMARY

The disclosure is directed to a method for extending a DC voltage range of an actively-controlled, particularly a single-stage rectifier circuit, having a DC voltage on the DC output of the single-stage rectifier which can be set, firstly, at values slightly below a critical voltage $U_{cr}$, even if the critical voltage undershoots a nominal value for the amplitude of the alternating voltage. Additionally, it should be possible to set higher DC voltages on the DC rectifier output, with the smallest possible conversion losses. It is intended that the method should be as simple and as cost-effective as possible to execute. The disclosure is also directed to a rectifier circuit for executing the method, and an electrolysis system having such a rectifier circuit.

The method according to the disclosure is intended to extend a DC voltage range of a rectifier circuit for the supply, from an alternating voltage (AC) grid, of a DC load which is connected to a DC rectifier output, wherein an AC rectifier input of the rectifier circuit is connected via a grid connection point to the AC grid. The rectifier circuit comprises an AC/DC converter having an AC input and a DC output, which AC/DC-converter comprises a converter circuit having semiconductor switches and freewheeling diodes connected in an antiparallel arrangement thereto. The AC input of the AC/DC converter is connected—optionally via an AC isolating unit—to the AC rectifier input, and the DC output of the AC/DC converter is connected to the DC rectifier output—optionally via a DC isolating circuit. An inductance L is arranged between the AC input of the AC/DC converter and the grid connection point.

The method comprises setting of a desired DC operating voltage $U_{DC,Soll}$ on the DC output of the AC/DC converter and/or on the DC rectifier output, by the actuation of the semiconductor switches of the AC/DC converter, wherein, when the desired DC operating voltage $U_{DC,Soll}$ lies below a value of the amplitude $\hat{U}_4$ of an alternating voltage on the AC input of the AC/DC converter, the semiconductor switches of the AC/DC converter are actuated for an exchange of reactive power $Q_1(t)$ with the AC grid, such that the exchange of reactive power $Q_1(t)$ has a voltage-lowering effect upon the amplitude $\hat{U}_4$ at the AC input of the AC/DC converter—and thus also on the AC input of the converter circuit. By means of the voltage-lowering effect, the amplitude $\hat{U}_4$ of the alternating voltage approaches the desired DC operating voltage $U_{DC,Soll}$. The approach of the amplitude $\hat{U}_4$ to the desired DC operating voltage $U_{DC,Soll}$ is executed such that the desired DC operating voltage $U_{DC,Soll}$ is also achieved, provided that a permissible exchange of reactive power with the AC grid, for example in accordance with an instruction issued by the operator of the AC grid, does not limit this approach. The exchange of the reactive power $Q_1(t)$ with the AC grid is executed in conjunction with an electrical connection and/or in conjunction with an electrical isolation of the DC load to/from the rectifier circuit.

In this context, the term "in conjunction with" is to be understood in the sense of "during and/or shortly before". For example, the rectifier circuit can be a single-stage rectifier circuit, which has no DC/DC converter arranged between the AC/DC converter and the DC rectifier output. The rectifier circuit can comprise one phase terminal on the AC side but, alternatively, can also comprise a number of phase terminals. As the AC input of the AC/DC converter corresponds to the AC input of the converter circuit, but is connected to the latter at least in a low-impedance arrangement, the amplitude $\hat{U}_4$ applied to the AC input of the AC/DC converter also corresponds to the amplitude which is applied to the AC input of the converter circuit.

The amplitude $\hat{U}_4$ of the AC voltage applied to the AC input of the AC/DC converter, and the amplitude $\hat{U}_7$ of the AC voltage applied to the AC rectifier input of the rectifier circuit, can respectively comprise the amplitude of a prevailing alternating voltage on a phase conductor, relative to a neutral point or star point of a transformer, i.e. the amplitude of the phase-to-neutral voltage. This is the case when the converter circuit of the AC/DC converter is configured in the form of a star-connected circuit. In this case, an output terminal of the DC output can be connected to the neutral point of the transformer, or to a neutral conductor of the AC grid. Alternatively, the amplitude $\hat{U}_4$ of the AC voltage applied at the AC input of the AC/DC converter can also be the amplitude of an AC voltage prevailing between two phase conductors of the AC grid, i.e. the amplitude of the interlinked voltage. Accordingly, the same also applies to the amplitude $\hat{U}_7$ of the AC voltage applied to the AC rectifier input of the rectifier circuit. This is the case, for example, when the converter circuit of the AC/DC converter is configured in the form of a "bridge circuit". In this case, there is no requirement whatsoever for a transformer with a neutral point tap, as a current only flows between the phase conductors of the AC grid. For example, in a three-phase AC grid, the amplitudes of the neutral voltage and the interlinked voltage are mutually associated by the interlinking factor $\sqrt{3}$.

The method according to the disclosure exploits the finding to the effect that an exchange of reactive power between the AC/DC converter and the AC grid, via the interposing arrangement of the inductance L, results in a variation in the amplitude $\hat{U}_4$ of the AC voltage applied to the AC input of the AC/DC converter. Specifically, the amplitude $\hat{U}_4$ of the AC voltage can be reduced by the exchange of one type of reactive power, for example, inductive reactive power, whereas it can be increased by the exchange of a complementary type of reactive power, for example capacitive reactive power. In the context of the disclosure, the exchange of the reactive power $Q_1(t)$ is deliberately employed for the variation of the amplitude $\hat{U}_4$ of the alternating voltage, in order to influence the DC voltage on the DC output of the converter circuit and thus, additionally, the DC voltage on the DC rectifier output, where the DC isolating circuit is closed. If, for example, it is intended to set a DC operating voltage $U_{DC,Soll}$ on the DC rectifier output—and thus additionally on the DC output of the AC/DC converter—which is lower than the amplitude $\hat{U}_4$ of the AC voltage on the AC input of the AC/DC converter, a short-term exchange of the reactive power $Q_1(t)$ with the AC grid is executed. A current associated with the reactive power $Q_1(t)$ flows through the inductance L, and has a voltage-lowering effect upon the amplitude $\hat{U}_4$ of the AC voltage. In this manner, the amplitude $\hat{U}_4$ of the AC voltage applied to the AC/DC converter is reduced. The reduced amplitude $\hat{U}_4$, via the freewheeling diodes of the converter circuit, generates a likewise reduced value of the DC voltage at the DC output of the converter circuit, and thus on the DC rectifier output. By means of the quantity of reactive power $Q_1(t)$ exchanged, a percentage reduction or percentage increased in the amplitude $\hat{U}_4$, relative to the original amplitude $\hat{U}_4$—i.e. prior to the exchange of reactive power—can be set. In one embodiment the short-term exchange of the reactive power $Q_1(t)$ is executed such that the amplitude $\hat{U}_4$ on the AC input of the AC/DC converter, and thus the DC voltage on the DC output of the AC/DC converter, approaches the desired DC operating voltage $U_{DC,Soll}$, and—depending upon the maximum possible or permitted exchange of reactive power $Q_1(t)$—the desired DC operating voltage $U_{DC,Soll}$ is also achieved.

Conversely to the known prior art, the exchange of the reactive power $Q_1(t)$ between the AC/DC converter and the AC grid is not executed with the objective of counteracting an existing deviation in an amplitude of the AC voltage, and thereby supporting the AC grid. In this case, conversely to the prior art, the purpose of the exchange of the reactive power $Q_1(t)$ is a deliberate deviation of the amplitude $\hat{U}_4$, at least temporarily, from its nominal value. The resulting deliberate deviation in amplitude from its nominal value is employed, according to the disclosure, for the operation of a DC load, for example, an electrolyzer, at least temporarily, with a lower DC voltage at the input thereof than would otherwise be possible. A short-term variation in the DC voltage, in this case the reduction of the DC voltage, is thus the actual objective of the exchange of the reactive power $Q_1(t)$. This provides the most load-free arrangement possible for the connection or isolation of the DC load, for example, the electrolyzer, from the rectifier circuit, and thus permits the protective operation of isolating circuits and the electrolyzer.

According to the disclosure, the exchange of the reactive power $Q_1(t)$ is executed during and/or shortly before the connection of the DC load to the rectifier. It is possible, but not absolutely necessary, that a further exchange of the reactive power $Q_1(t)$ with the AC grid is executed after, for example, shortly after the electrical connection of the DC load to the rectifier. Specifically, where the DC load is an electrolyzer, the voltage at the input of the electrolyzer can be reduced to a value slightly below the critical voltage $U_{cr}$. As a result, the connection to, and isolation of the electrolyzer from the rectifier circuit can be executed in the most load-free and protective manner possible for the respective isolating circuit. A controlled soft start-up and/or termination of the electrolysis reaction can also be achieved by a variation in the reactive power $Q_1(t)$ exchanged. Specifically, at the start of the electrolysis reaction, the exchange of the reactive power $Q_1(t)$ can be reduced, whereas the active power converted $P(t)$ is simultaneously increased. In a corresponding manner, at the end of the electrolysis reaction, active power converted can be reduced, whereas the exchange of the reactive power is simultaneously increased, in order to further reduce the DC voltage on the DC output of the AC/DC converter. It is moreover possible, but not absolutely necessary, that a further exchange of the reactive power $Q_1(t)$ with the AC grid is executed after, for example, shortly after the isolation of the DC load from the rectifier. Thus, for example, the exchange of the reactive power $Q_1(t)$ with the AC grid can be reduced in a steady and controlled manner, for example, by way of a controlled downward ramp. In this manner, any abrupt variation in the reactive power $Q_1(t)$ exchanged with the AC grid, and any resulting and unwanted reaction in the AC grid, can thus be prevented.

The inductance L, at least to a certain extent, is a component of the rectifier which is customarily present in any event. Specifically, in the rectifier circuits considered here, for the damping of high-frequency interference signals, a filter circuit is provided between the AC rectifier input and the AC input of the AC/DC converter, which comprises one or more filter reactors. In many cases, the one or more filter reactors can be employed with no adaptation, or least with only minor adaptation, as an element of the inductance L via which the exchange of the reactive power $Q_1(t)$ with the AC grid is executed. In many cases, accordingly, no additional hardware is required whatsoever, or is only required to a limited extent. Likewise, with respect to semiconductor switches in the converter circuit, no requirement applies for adaptation of hardware for the exchange of reactive power $Q_1(t)$, only a requirement for the adjustment of the duty cycle of software. Overall, this results in a relatively cost-effective and simple adaptation of a conventional rectifier circuit for the execution of the method according to the disclosure.

In one embodiment of the method, the reactive power $Q_1(t)$ that is exchanged between the AC/DC converter and the AC grid, virtually exclusively, but at least to a predominant proportion, is displacement reactive power. Accordingly, it includes no component, or only an unavoidable component of distortive reactive power. It is thus ensured that the desired sine-wave form of the alternating voltage is maintained, even in the event of the exchange of the reactive power $Q_1(t)$.

In a further embodiment of the method, it is possible that the exchange of the reactive power $Q_1(t)$ between the AC/DC converter and the AC grid only occurs if the desired DC operating voltage $U_{DC,soll}$, by a specific differential value, lies below the value of the amplitude $\hat{U}_4$. For example, the exchange of reactive power can then proceed, if the desired DC operating voltage $U_{DC,soll}$, additionally to the value of the amplitude $\hat{U}_4$, also undershoots the average rectified value of the alternating voltage at the amplitude $\hat{U}_4$. In this manner, in the event of a DC load having a predominantly ohmic component, any unnecessary exchange of the reactive power $Q_1(t)$, and any associated and unwanted reaction in the grid, can thus be reduced.

According to a further embodiment of the disclosure, the exchange of reactive power $Q_1(t)$ is employed, not only for a reduction, but also for an increase in the amplitude $\hat{U}_4$ of the AC voltage. In the latter case, during a specific operating situation of the DC load, for example, if the desired DC operating voltage $U_{DC,soll}$ achieves or exceeds a voltage threshold value $U_{TH}$, the semiconductor switches of the AC/DC converter are actuated for the exchange of a further reactive power $Q_2(t)$ with the AC grid, such that the exchange of the further reactive power $Q_2(t)$ has a voltage-increasing effect upon the amplitude $\hat{U}_4$ at the AC input of the converter circuit. In this manner, here again, the amplitude $\hat{U}_4$ of the desired DC operating voltage $U_{DC,soll}$ can be approached. The further reactive power $Q_2(t)$ can be a complementary type of the reactive power $Q_1(t)$. In other words, if the reactive power $Q_1(t)$ is inductive reactive power, the further reactive power $Q_2(t)$ can be capacitive reactive power, and vice versa. By means of the AC/DC converter, in this case, simultaneously with the rectification of the AC voltage, a slight step-up in the DC voltage which is present on the AC output of the AC/DC converter is required in one embodiment. Overall, this can result in the reduction of conversion losses on the AC/DC converter.

The exchange of the reactive power $Q_1(t)$ and/or of the further reactive power $Q_2(t)$ can comprise the determination of a reactive power target value, based upon a known voltage variation characteristic $u(Q)$ as a function of the reactive power Q exchanged between the AC input of the AC/DC converter and the grid connection point of the AC grid. Specifically, the relationship to the known voltage variation characteristic $u(Q)$ can be determined, for example, on a one-off basis, and saved in a data memory which is connected to a control circuit of the rectifier circuit. Alternatively, it is possible for the exchange of the reactive power $Q_1(t)$ and/or of the further reactive power $Q_2(t)$ to be executed adaptively in each case, by means of a regulating circuit which is connected to the control circuit. An actual value of a DC voltage $U_{DC,4}$ present on the AC output of the AC/DC converter can be detected, the actual value detected is compared with the desired DC operating voltage $U_{DC,Soll}$, and the exchange of the respective reactive power $Q_{1,2}(t)$ is regulated such that the actual value approaches the desired DC operating voltage $U_{DC,Soll}$. The regulating circuit can comprise a proportional controller, an integral controller and/or a derivative controller.

Regardless of whether the exchange of the reactive power $Q_1(t)$ and/or of the further reactive power $Q_2(t)$ is executed by means of a known voltage variation characteristic $u(Q)$ or is executed adaptively by means of a regulating circuit, the exchange of the reactive power $Q_1(t)$ and/or the exchange of the further reactive power $Q_2(t)$ can generate a variation in the amplitude $\hat{U}_4$ on the AC input of the AC/DC converter of at least 10%, for example, at least 20%, or at least 25%, in relation to a nominal value of the amplitude $\hat{U}_4$. The quantity of the reactive power $Q_{1,2}(t)$ exchanged which is required to generate the corresponding variation in the amplitude $\hat{U}_4$ is dependent upon the value of the inductance L between the AC/DC converter and the grid connection point. In this context, the nominal value of the amplitude $\hat{U}_4$ is to be understood as the value of the amplitude $\hat{U}_4$ which will be present on the AC input of the AC/DC converter, in the absence of any exchange of reactive power $Q_{1,2}(t)$ between the AC/DC converter and the AC grid.

In one embodiment of the method, under specified marginal conditions, a grid services exchange of reactive power between the AC/DC converter and the AC grid can be executed, for example, in the interests of voltage stability. Specifically, during a state of the AC grid in which the amplitude $\hat{U}_7$ of the alternating voltage on the AC rectifier input deviates from its nominal value, an exchange of a third reactive power $Q_3(t)$ between the AC/DC converter and the AC grid is executed which, depending upon the quality of the third reactive power $Q_3(t)$, generates a voltage-reducing or voltage-increasing effect on the amplitude $\hat{U}_7$ of the AC voltage. In the interests of voltage stability, the third reactive power $Q_3(t)$ is selected such that the resulting effect upon the amplitude $\hat{U}_7$ counteracts the deviation from its nominal value. The specified marginal conditions can comprise a ripple-control signal and/or a contractual agreement with an operator of the AC grid.

According to one embodiment of the method, the inductance can comprise a filter reactor which is arranged between the AC/DC converter and the AC rectifier input, via which the reactive power $Q_1(t)$ and/or the further reactive power $Q_2(t)$ are/is exchanged with the AC grid. Alternatively or cumulatively, the inductance can comprise a transformer winding on a secondary side of a transformer which is assigned to the rectifier circuit. This will be the case, for example, if the rectifier is connected to the AC grid via a transformer, wherein the rectifier circuit is connected to the secondary side of the transformer and the AC grid is connected to the primary side of the transformer. In a configuration of this type, on the AC grid, i.e. on the primary side of the transformer, at least one further installation which is appropriate for reactive power compensation can additionally be connected, which functions as a sink for the reactive power $Q_1(t)$ exchanged by the AC/DC converter with the AC grid and/for the further reactive power $Q_2(t)$. The appropriate installation for reactive power compensation can be controlled in a coordinated manner with the rectifier circuit, such that the exchange of reactive power thereof with the AC grid is executed. As the further installation functions as a sink for reactive power exchanged by the AC/DC converter with the AC grid, any reaction on the AC grid associated with the exchange of reactive power can be eliminated, or at least reduced. Accordingly, an operator of the AC grid is not required to reserve any further installations for the execution of any reactive power compensation required. A permissible component of reactive power exchanged with the AC grid can thus be optionally increased.

A rectifier circuit according to the disclosure is constituted by an actively-controlled rectifier circuit, which is configured to supply a DC load from an AC grid having an AC voltage.

In one embodiment, the recitifier circuit comprises an AC rectifier input having a plurality of input terminals configured to connect to the AC grid, and a DC rectifier output having two output terminals configured to connection to the DC load, and an AC/DC converter, comprising an AC input that is connected to the AC rectifier input, a DC output that is connected to the DC rectifier output, and a converter circuit arranged between the AC input and the DC output. The converter circuit of the AC/DC converter comprises actively controllable semiconductor switches, and freewheeling diodes connected in an antiparallel connected arrangement thereto. In addition to the rectification function, the AC/DC converter is moreover configured to exchange reactive power $Q_{1,2}(t)$ with the AC grid. The rectifier circuit moreover comprises a control circuit configured to control the AC/DC converter, for example, the semiconductor switches thereof. The rectifier circuit in one embodiment is configured to execute the method according to the disclosure.

The plurality of input terminals of the rectifier circuit can comprise one phase terminal and a neutral conductor terminal. Alternatively, however, they can also comprise a plurality of phase terminals and no or one neutral conductor terminal. The above-mentioned advantages with respect to the method apply accordingly.

According to one embodiment, the rectifier circuit can comprise a regulating circuit that, in conjunction with the control circuit, is configured to set the reactive power $Q_1(t)$, and optionally also the further reactive power $Q_2(t)$ exchanged with the AC grid such that the DC voltage on the DC output of the AC/DC converter approaches the desired DC operating voltage $U_{DC,Soll}$, if possible until the DC operating voltage $U_{DC,Soll}$ is achieved. Specifically, the regulating circuit can be configured to detect a DC voltage $U_{DC,4}$ present on the DC output of the AC/DC converter and/or on the DC rectifier output, to compare the detected DC voltage $U_{DC,4}$ with the desired DC operating voltage $U_{DC,Soll}$, and in conjunction with the control circuit, to control the AC/DC converter such that the detected DC voltage $U_{DC,4}$ approaches the desired DC operating voltage $U_{DC,soll}$ and, insofar as possible, achieves the desired DC operating voltage $U_{DC,Soll}$. In this manner, the AC/DC converter is capable of responding adaptively to a currently existing voltage variation characteristic $u(Q)$ between the AC input of the AC/DC converter and the grid connection point, without the necessity for the prior determination and, optionally, saving thereof. Alternatively, however, it is also possible that the voltage variation characteristic $u(Q)$ as a function of the reactive power $Q$ is to be determined beforehand, and that the reactive power $Q_1(t)$ and/or the further reactive power $Q_2(t)$ to be exchanged with the AC grid is to be set in accordance with the voltage variation characteristic $u(Q)$ thus determined. To this end, the control circuit of the rectifier circuit can comprise a data memory, or be connected to a data memory, which is configured to save determined value pairs that reflect a previously defined voltage variation characteristic $u(Q)$.

In one embodiment, the rectifier circuit can comprise a filter circuit having a filter reactor or a plurality of filter reactors. The at least one filter reactor can be arranged between the AC input of the AC/DC converter and the AC rectifier input. It thus constitutes at least an element of the inductance via which the reactive power $Q_1(t)$ and/or the further reactive power $Q_2(t)$ is exchanged with the AC grid. Advantageously, an impedance of the filter reactor can be rated such that, in the event of a nominal current flow $I_0$ in the filter reactor of the rectifier, a voltage drop of at least 25%, for example, at least 35%, or at least 45% results, relative to the AC voltage which is present on the AC rectifier input. The impedance, and thus also the inductance $L$ of the filter reactor are dimensioned such that, firstly, a particularly effective voltage-reducing effect upon amplitude is achieved by the exchange of the reactive power $Q_{1,2}(t)$, together with additional current limitation in the event of a short-circuit on the DC side. This additional current limitation minimizes the risk that, in the event of a short-circuit on the DC load, the freewheeling diodes of the converter circuit will sustain damage.

An electrolysis system according to the disclosure comprises a rectifier circuit according to the disclosure and an electrolyzer, as a DC load, connected at the output side of the rectifier circuit. The electrolysis system can additionally comprise a transformer which, at its secondary side, is connected to the AC rectifier input and, at its primary side, is connected to the AC grid via the grid connection point. If the electrolysis system comprises a transformer, it can also comprise an appropriate reactive power compensating installation for the reduction of any reaction on the grid. The appropriate reactive power compensating installation is connected to the AC grid at the primary side of the transformer, and functions as a sink for the reactive power $Q_1(t)$ and/or the further reactive power $Q_2(t)$ exchanged by the AC/DC converter with the AC grid. Here again, the above-mentioned advantages described with respect to the method apply.

BRIEF DESCRIPTION OF THE FIGURES

The disclosure is represented hereafter with reference to figures. In the figures.

DETAILED DESCRIPTION

Figure 1:
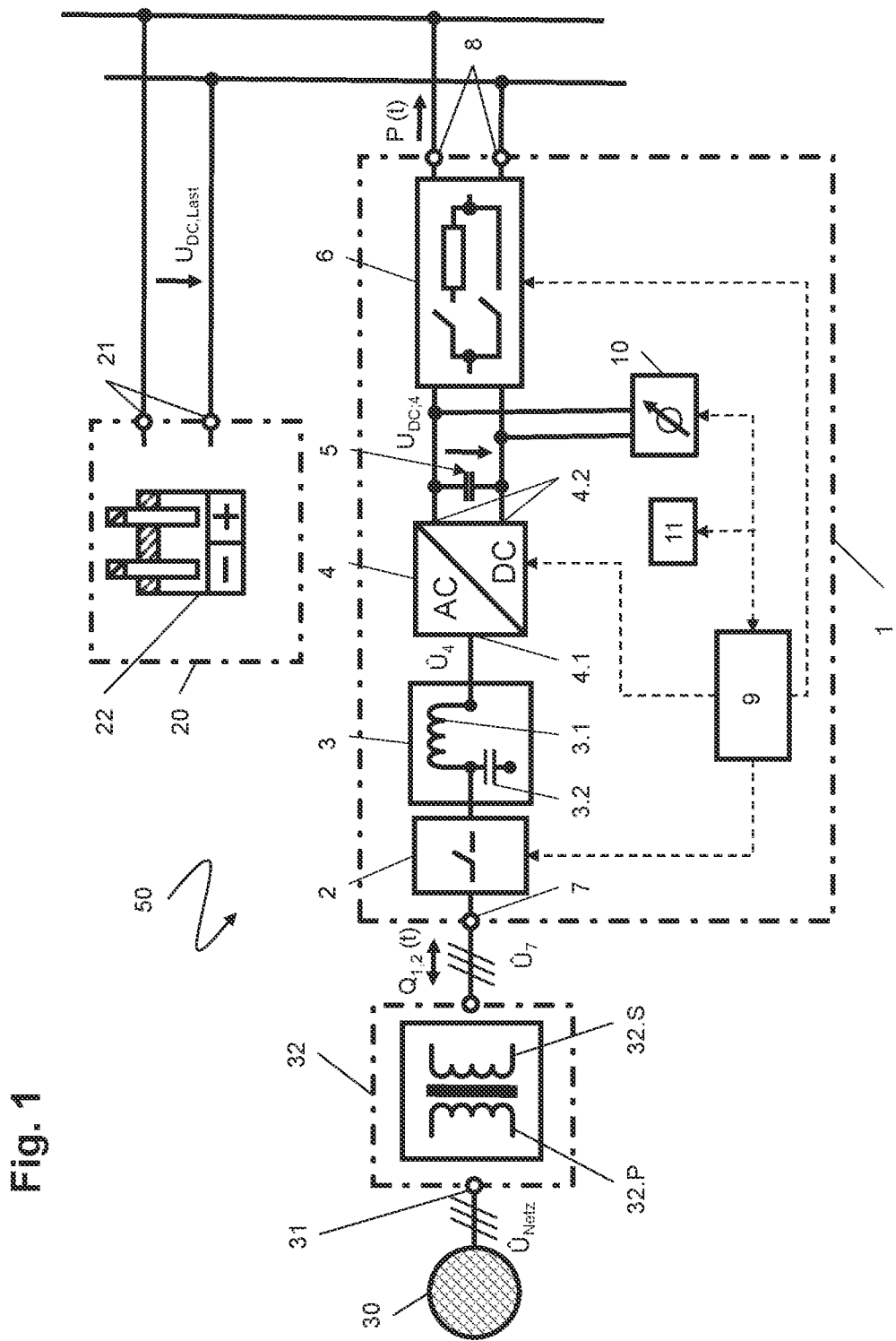
FIG. 1 shows an embodiment of an electrolysis system according to the disclosure, having a rectifier circuit according to the disclosure.

FIG. 1 illustrates an embodiment of an electrolysis system 50 according to the disclosure. The electrolysis system 50 comprises an electrolyzer 22, as a DC load 20, a rectifier 1 according to the disclosure and a transformer 32. The transformer 32 is connected, at its primary side 32.P, to an alternating voltage (AC) grid 30 via a grid connection point 31. A secondary side 32.S of the transformer 32 is connected to an AC rectifier input 7 of the rectifier circuit 1. The transformer 32 converts a primary side AC voltage of amplitude $\hat{U}_{Netz}$ into an AC voltage of amplitude $\hat{U}_7$, which is present on both the secondary side and on the AC rectifier input 7. A DC rectifier output 8 of the rectifier circuit 1 is connected to an input 21 of the electrolyzer 22.

The rectifier circuit 1 is an actively controllable rectifier circuit, which is configured to convert the AC voltage present on the input side into a DC voltage which is present on the DC rectifier output 8, in order to supply the DC voltage $U_{DC,Last}$ to the electrolyzer 22. To this end, the rectifier circuit 1 comprises an AC/DC converter 4 having an AC input 4.1 and a DC output 4.2, which is controlled by a control circuit 9. The AC input 4.1 is connected via a filter circuit 3 with a filter reactor 3.1 and a filter capacitance 3.2, and via an AC isolating circuit 2 to the AC rectifier input 7. The DC output 4.2 is connected via a DC isolating circuit 6 to the DC rectifier output 8. In parallel with the DC output 4.2, an output capacitance 5 is connected for smoothing a DC voltage $U_{DC,4}$ which is present on the DC output 4.2. In one embodiment the DC isolating circuit 6 comprises two current paths, which are arranged in parallel with one another. A first current path contains a series-connected arrangement of a precharge resistor and an isolating switch, and is employed for the precharging of the electrolyzer 22. The second current path, which is arranged parallel thereto, contains only a further isolating switch. After precharging, the electrolyzer 22 is operated in its ohmic range, wherein the closed further isolating switch forms a low-impedance electrical connection between the DC output 4.2 of the AC/DC converter 4 and the electrolyzer 22. Both the DC isolating circuit 2 and the AC isolating circuit 6 are actuated by the control circuit 9 of the rectifier circuit 1.

The rectifier circuit 1 according to the disclosure is configured, by the corresponding actuation of semiconductor switches of the AC/DC converter 4, to exchange reactive power $Q_{1,2}(t)$, via the transformer 32, with the AC grid 30. A current associated with the reactive power $Q_{1,2}(t)$ flows via an inductance L which, in the case illustrated in FIG. 1, is formed of filter reactors 3.1 of the filter circuit 3 and windings of the secondary side 32.S of the transformer 32. The reactive power $Q_{1,2}(t)$, virtually exclusively, but at least to a predominant proportion, is displacement reactive power. The exchange of the reactive power $Q_{1,2}(t)$, as explained in greater detail with reference to FIG. 2 and FIG. 3, depending upon the type of the reactive power $Q_{1,2}(t)$, results in a voltage-reducing or voltage-increasing effect on an amplitude $\hat{U}_4$ of an AC voltage which is applied to the AC input 4.1 of the AC/DC converter 4, by which a DC voltage range of the rectifier circuit 1, particularly of the AC/DC converter 4, is extended. The quantity of reactive power exchanged can be set, on the one hand, by reference to a known voltage variation characteristic u(Q) determined, for example, on a one-off basis, in conjunction with the control circuit 9. To this end, the rectifier circuit 1 can comprise a data memory circuit 11 for the storage of value pairs which reflect the previously determined voltage variation characteristic u(Q). Alternatively or cumulatively, the rectifier circuit 1 can also comprise a regulating device or circuit 10, which is configured to detect the DC voltage $U_{DC,4}$ which is present on the DC output 4.2 of the AC/DC converter, and also optionally the AC voltage of amplitude $\hat{U}_4$ which is present on the AC input 4.1, compare the detected DC voltage $U_{DC,4}$ with a desired DC operating voltage $U_{DC,soll}$, and transmit a comparison result to the control circuit 9. The control circuit 9, in turn, varies the reactive power $Q_{1,2}(t)$ exchanged between the AC grid 30 and the AC/DC converter 4 via a corresponding actuation of the semiconductor switches of the AC/DC converter 4, such that the DC voltage $U_{DC,4}$ approaches the desired operating voltage $U_{DC,soll}$ and, insofar as possible, achieves the latter.

In FIG. 1, the rectifier circuit 1, the transformer unit 32 and the AC grid are exemplarily represented as three-phase components in each case. According to the disclosure, however, it is also possible for each of these to be configured as single-phase components. The control circuit 9 of the rectifier circuit 1 can moreover be connected to a communication circuit (not represented in FIG. 1). In this manner, a synchronously-executed actuation of further reactive power compensating installations, which are connected to the AC grid on the primary side of the transformer, can be initiated and coordinated.

Figure 2:
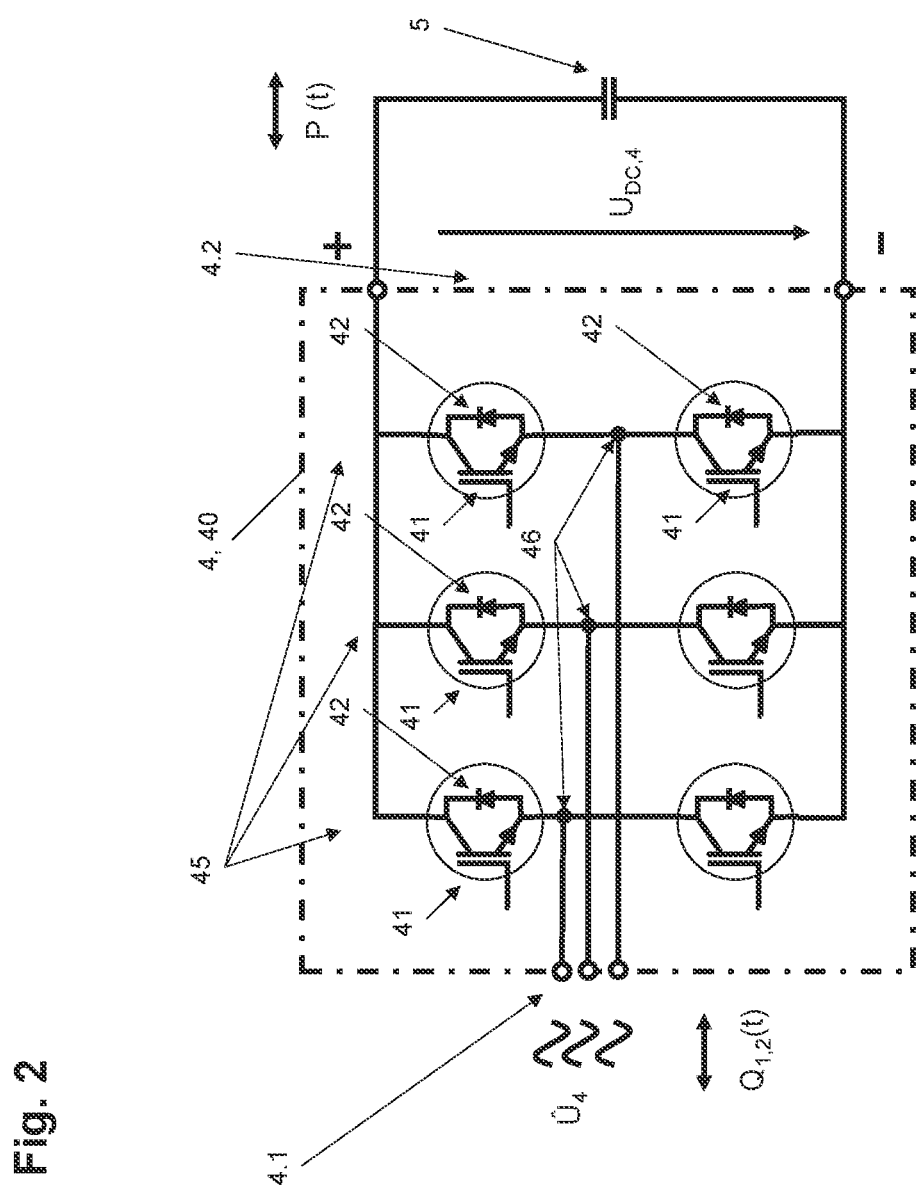
FIG. 2 shows an embodiment of a converter circuit of the rectifier circuit according to the disclosure, according to FIG. 1.

FIG. 2 shows a more detailed representation of an embodiment of the AC/DC converter 4 according to FIG. 1 which is assigned to, or a component within, the rectifier circuit 1. In the same manner as the rectifier circuit 1 according to FIG. 1, the AD/DC converter 4 is configured in one embodiment as a three-phase AC/DC converter 4, and comprises a converter circuit 40 having a total of three bridge arms 45. Each of the bridge arms 45 comprises two series-connected semiconductor switches 41, each having an antiparallel-connected freewheeling diode 42. The freewheeling diode 42 can be configured as an intrinsic diode of the respective semiconductor switch 41, or as a separate diode. The semiconductor switches 41 can be MOSFET or IGBT semiconductor switches. In accordance with the three-phase configuration of the converter circuit 40, the AC input 4.1 of the AC/DC converter 4 comprises three input terminals, each of which is connected to a connection point 46 of the two semiconductor switches 41 in the bridge arm 45 which is assigned thereto. The DC output 4.2 of the DC/AC converter 4 comprises a positive (+) and a negative (−) output terminal.

During conversion, the AC/DC converter 4 can transmit active power P(t) from the AC input 4.1 to the DC output 4.2 and, optionally, also in the reverse direction from the DC output to the AC input 4.1. The AC/DC converter 4 is moreover configured to exchange reactive power $Q_{1,2}(t)$ between the AC input 4.1 of the AC/DC converter 4 and the AC grid 30 connected to the AC input 4.1 (not explicitly represented in FIG. 2). To this end, the semiconductor switches 41 are actuated by the control circuit 9 (not explicitly represented in FIG. 2). Using a corresponding clocking of the semiconductor switches 41, the AC/DC converter 4 is configured to convert the AC voltage which is present on the AC input 4.1 into a DC voltage $U_{DC,4}$ on the DC output 4.2. The magnitude of the converted DC voltage, in other words the DC voltage range, can assume values between a minimum $U_{DC,min}$ and a maximum DC voltage $U_{DC,max}$. The minimum DC voltage $U_{DC,min}$ is downwardly limited, by the freewheeling diodes 42, to a value which—excluding a conducting-state voltage of the freewheeling diodes 42—corresponds to the amplitude $\hat{U}_4$ of the AC voltage which is present on the AC input 4.2. Using the freewheeling diodes 42, the bridge circuit 43 is configured to generate a DC voltage $U_{DC,4}$ on the DC output 4.2 which is greater, but not smaller, at least not significantly smaller than the amplitude $\hat{U}_4$ of the AC voltage which is applied to the input side. Conversion losses increase, as the ratio of the output-side DC voltage $U_{DC,4}$ to the amplitude $\hat{U}_4$ of the input side AC voltage rises. As the AC/DC converter 4 exchanges reactive power $Q_{1,2}(t)$ with the AC grid 30 via the inductance L, for example, the filter reactors 3.1 and/or the inductance assigned to the secondary side of the transformer, a resulting voltage-reducing or voltage-increasing effect is executed on the amplitude $\hat{U}_4$ of the AC voltage which is present on the AC input 4.1. This is described in greater detail with reference to FIG. 3.

FIG. 2 represents an example two-level converter circuit 40 having two voltage levels. In the context of the disclosure, however, a converter circuit having more than only two voltage levels, for example a three-level or five-level converter circuit, is also possible. Moreover, in the context of the disclosure, it is possible for converter circuit to be configured in the form of a neutral point circuit. An output terminal (−) of the DC output 4.2 can thus be connected to a neutral point tap of a transformer 32, via which the AC/DC converter 4 is connected to the AC grid 30. Alternatively, it can also be connected to a neutral conductor of the AC grid 30.

Figure 3:
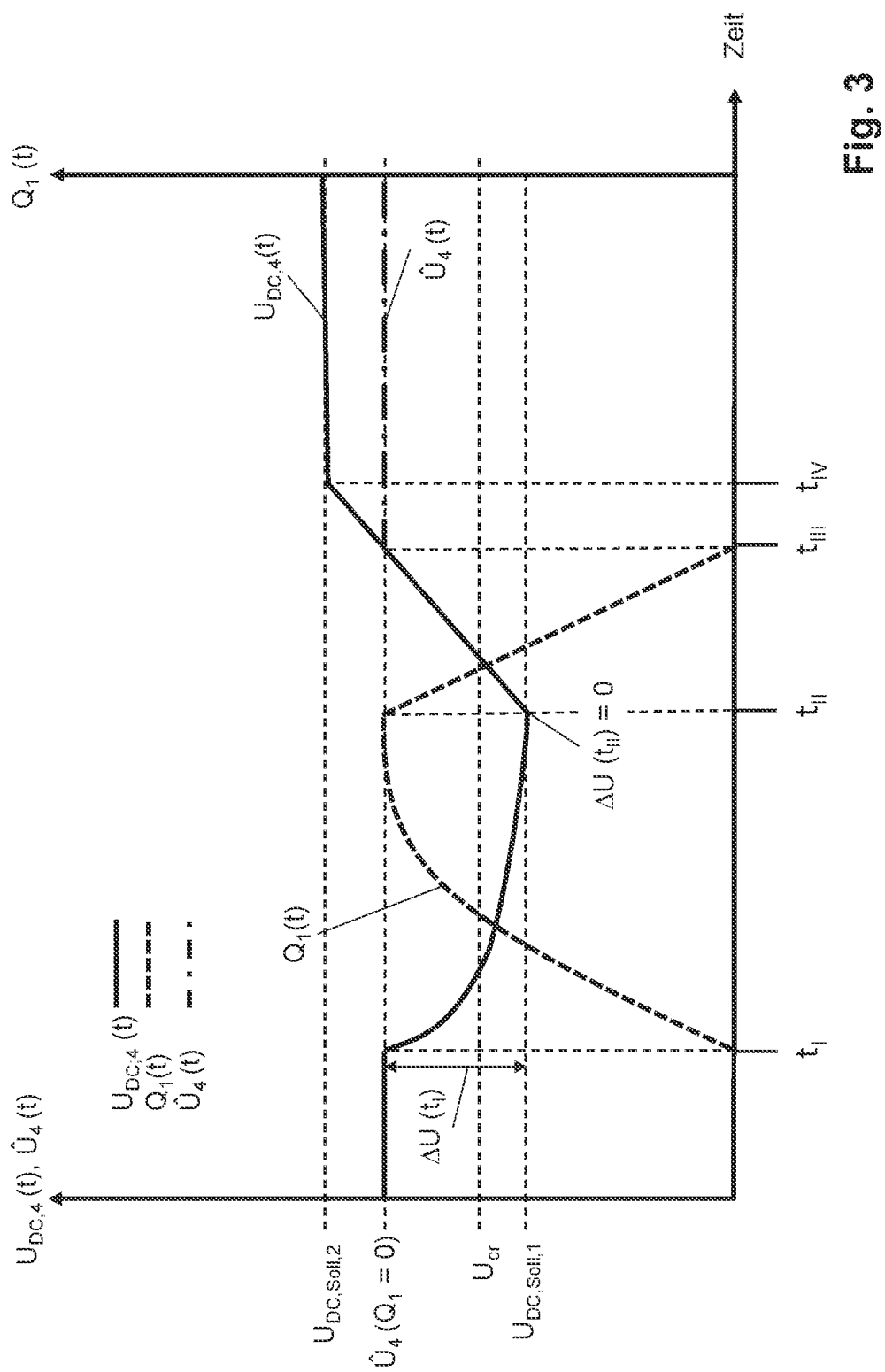
FIG. 3 shows a schematic representation of a temporal characteristic of the method according to the disclosure, according to one embodiment.

FIG. 3 shows a schematic representation of a temporal characteristic of the method according to the disclosure, in an embodiment which can be executed using the regulating circuit 10. Temporal characteristics are plotted for the following: DC voltages $U_{DC,4}$ on the DC output 4.2 of the AC/DC converter 4, the amplitude $\hat{U}_4$ of the AC voltage on the AC input 4.1 of the AC/DC converter 4, and the reactive power $Q_1(t)$ exchanged between the AC/DC converter 4 and the AC grid 30 via the inductance L. In FIG. 3, a positive value for the exchange of the reactive power $Q_1(t)$ generates a voltage-reducing effect on the amplitude $\hat{U}_4$ of the AC voltage. Individual temporal characteristics, as illustrated in FIG. 3 next to the vertical coordinate axis, are represented by lines of different types. These temporal characteristics represent an example case which can occur, for example, in the event of the connection of the electrolyzer 22, as a DC load 20, to the actively-controlled rectifier circuit 1.

The starting point is a state in which the electrolyzer 22 is isolated from the rectifier circuit 1. However, precharging of the electrolyzer 22 has already been executed to the effect that the input-side DC voltage $U_{DC,Last}$ assumes a value slightly below the critical voltage $U_{cr}$, such that no electrolysis reaction proceeds as yet. At times $t < t_I$, no reactive power $Q_1(t)$ is exchanged initially between the AC/DC converter 4 and the AC grid 30, at $t < t_I$, $Q_1(t) = 0$. A value for the amplitude $\hat{U}_4$ of the AC voltage which is present on the AC input 4.1 lies above the critical voltage, in order to generate the lowest possible conversion losses at a high electrolysis reaction speed.

At time point $t_I$, it is signaled to the electrolysis system 50 that the rectifier circuit 1 is to be connected to the electrolyzer 22. For the execution of this connection with the most load-free arrangement possible, or at least with a reduced compensating current, a first value of the desired DC operating voltage $U_{DC,Soll,1}$, with effect from time point $t_I$, is likewise set to the currently present DC voltage $U_{DC,Last}$ on the input of the electrolyzer 22. The first value of the desired DC operating voltage $U_{DC,Soll,1}$ is thus lower than the amplitude $\hat{U}_4$ of the AC voltage which is present on the AC input 4.1 and, as the DC voltage $U_{DC,4}$ on the DC output 4.2, excepting the conducting-state voltage of the freewheeling diodes 42, corresponds to the amplitude $\hat{U}_4$, is also lower than the DC voltage $U_{DC,4}$ which is present on the output side. There is thus a relatively large difference $\Delta U(t_I)$ between the desired DC operating voltage $U_{DC,Soll,1}$ and the DC voltage $U_{DC,4}$ which is present on the output side. The regulating circuit 10 detects the DC voltage $U_{DC,4}$ which is present on the output side, compares it with the desired DC operating voltage $U_{DC,Soll,1}$ and transmits the voltage difference $\Delta U(t_I)$ to the control circuit 9. In response thereto, the control circuit 9 actuates the semiconductor switches 41 of the converter circuit 40, in accordance with an increase in the reactive power $Q_1(t_I)$ exchanged with the AC grid 30. The exchange of the reactive power $Q_1(t)$, particularly by way of its associated current flow via the inductance L, generates a voltage-reducing effect on the amplitude $\hat{U}_4$ of the AC voltage which is present on the AC input 4.1. As a result, the value of the amplitude $\hat{U}_4$ and the corresponding DC voltage $U_{DC,4}(t)$ on the AC output 4.2 of the AC/DC converter 4 are reduced. In the time interval between $t_I$ and $t_{II}$, the currently present DC voltage $U_{DC,4}(t)$ is continuously detected by the regulating unit 10, and is compared with the first value for the desired DC operating voltage $U_{DC,Soll,1}$. This comparison shows a quantitative reduction in the difference $\Delta U(t)$ which, in turn, is communicated to the control circuit 9. The control circuit 9 again actuates the semiconductor switches 41 of the converter circuit 40, with the objective of a further increase in the exchange of the reactive power $Q_1(t)$. An increase in the reactive power $Q_1(t)$, and a consequent reduction of the amplitude $\hat{U}_4$, and of the DC voltage $U_{DC,4}$ on the DC output 4.2 of the AC/DC converter 4, is executed in the time interval between $t_I$ and $t_{II}$, until such time as the difference between the DC voltage $U_{DC,4}$ on the DC output 4.2 of the AC/DC converter 4 and the first value of the desired DC operating voltage $U_{DC,Soll,1}$ disappears. Ultimately, as a result, at time point $t_{II}$, the amplitude $\hat{U}_4$ of the input-side AC voltage, and the DC voltage $U_{DC,4}$ on the DC output 4.2 of the AC/DC converter 4, achieve the first value of the desired DC operating voltage $U_{DC,Soll,1}$. At time point $t_{II}$, the electrolyzer 22 can thus be connected to the rectifier circuit 1 by the closing of the DC isolating circuit 6, in a low-impedance and substantially load-free arrangement.

With effect from time point $t_{II}$, the first value $U_{DC,Soll,1}$ of the desired DC operating voltage is replaced by a second value of the desired DC operating voltage $U_{DC,Soll,2}$, at which an electrolysis reaction is now to be executed. Thus, in the time interval from $t_{II}$ to $t_{IV}$, a ramped approach of the DC voltage $U_{DC,4}$ on the DC output 4.2 of the AC/DC converter 4 to the now applicable second value of the desired DC operating voltage $U_{DC,Soll,2}$ is executed. This is accompanied by a likewise ramped reduction in the reactive power $Q_1(t)$ to a value of 0 in the time interval $t_{II}$-$t_{III}$. With effect from time point $t_{III}$, no reactive power $Q_1(t)$ is exchanged further between the AC/DC converter 4 and the AC grid 30, and the amplitude $\hat{U}_4$ of the AC voltage at the input 4.2 of the AC/DC converter resumes its original value at t=0.

The ramped characteristics, shown in FIG. 3, for the reactive power $Q_1(t)$ and for the DC voltage $U_{DC,4}$ on the DC output 4.2 of the AC/DC converter 4 can also assume a steeper gradient than that represented, and can observe a virtually step-wise temporal variation.

FIG. 3 represents the method according to the disclosure, for potential execution in an adaptive manner by means of the regulating circuit 10. No detailed knowledge of the voltage variation characteristic u(Q) between the grid connection point 31 of the AC grid 30 and the AC input 4.1 of the AC/DC converter is required. In the context of the disclosure, however, it is also possible for the method to be executed using a known voltage variation characteristic u(Q). By reference to the known voltage variation characteristic u(Q), further to the detection of the DC voltage $U_{DC,4}$ present on the DC output 4.2 of the AC/DC converter 4 and the comparison thereof with the first value of the desired DC operating voltage $U_{DC,soll,1}$, the corresponding voltage difference $\Delta U(t_I)$ is determined. By a comparison of the voltage difference $\Delta U(t_I)$ thus determined with the known voltage variation characteristic u(Q), the requisite reactive power $Q_1(t)$ for the setting of the desired DC operating voltage $U_{DC,Soll,1}$ can be determined. In response thereto, the control circuit 9 can actuate the semiconductor switches 42 of the AC/DC converter 4 for the exchange of the requisite reactive power $Q_1(t)$. The method according to the disclosure has been described above with reference to the connection of the electrolyzer 22 to the rectifier circuit 1 in the most load-free arrangement possible. Alternatively or cumulatively, however, it can also be executed in conjunction with a load-free isolation of the electrolyzer 22 from the rectifier circuit 1, by the opening of the DC isolating circuit 6. Specifically, by using the short-term exchange of reactive power $Q_1(t)$, the DC voltage $U_{DC,4}$ on the DC output of the AC/DC converter 4 which, in the event of the low-impedance connection of the rectifier circuit 1 to the electrolyzer 22, is likewise present on the input 21 thereof, shortly before and during the opening of the DC isolating circuit 6, can be reduced below the critical voltage $U_{cr}$ which is required for the maintenance of the electrolysis reaction.

What is claimed is:

1. A method for extending a DC voltage range of a rectifier circuit for a supply, from an AC grid, of a DC load which is connected to a DC rectifier output of the rectifier circuit, wherein an AC rectifier input of the rectifier circuit is connected via a grid connection point to the AC grid, wherein the rectifier circuit comprises an AC/DC converter having an AC input and a DC output, wherein the AC/DC converter comprises a converter circuit having semiconductor switches and freewheeling diodes connected in an antiparallel arrangement thereto, wherein an inductance is connected between the AC input of the AC/DC converter and the grid connection point, the method comprising:

setting a desired DC operating voltage $U_{DC,Soll}$ on the DC output of the AC/DC converter or on the DC rectifier output, or both, by an actuation of semiconductor switches of the AC/DC converter, wherein, when the desired DC operating voltage $U_{DC,Soll}$ lies below a value of an amplitude $\hat{U}_4$ of an alternating (AC) voltage on the AC input of the AC/DC converter, the semiconductor switches of the AC/DC converter are actuated for an exchange of reactive power $Q_1(t)$ with the AC grid, which has a voltage-lowering effect upon the amplitude $\hat{U}_4$ of the AC voltage at the AC input of the AC/DC converter, such that the amplitude $\hat{U}_4$ approaches the desired DC operating voltage $U_{DC,Soll}$, and wherein the exchange of the reactive power $Q_1(t)$ with the AC grid is executed during or shortly before an electrical connection and/or an electrical isolation of the DC load to or from the rectifier circuit.

2. The method as claimed in claim 1, wherein the reactive power $Q_1(t)$ which is exchanged between the AC/DC converter and the AC grid, to a predominant proportion, is displacement reactive power.

3. The method as claimed in claim 1, wherein the inductance comprises a filter reactor arranged between the AC/DC converter and the AC rectifier input, or a transformer winding on a secondary side of a transformer that is operably coupled to the rectifier circuit, or both, the filter reactor and the transformer winding on the secondary side of the transformer.

4. The method as claimed in claim 1, wherein, if the desired DC operating voltage $U_{DC,Soll}$ achieves or exceeds a voltage threshold value $U_{TH}$, the semiconductor switches of the AC/DC converter are actuated for an exchange of a further reactive power $Q_2(t)$ with the AC grid, such that the exchange of the further reactive power $Q_2(t)$ has a voltage-increasing effect upon the amplitude $\hat{U}_4$ at the AC input of the AC/DC converter, such that the amplitude $\hat{U}_4$ approaches the desired DC operating voltage $U_{DC,Soll}$.

5. The method as claimed in claim 4, further comprising:

detecting an actual value of a DC voltage $U_{DC,4}$ present on the DC output of the AC/DC converter;

comparing the detected actual value with the desired DC operating voltage $U_{DC,Soll}$; and regulating an exchange of the further reactive power $Q_2(t)$ using a regulating circuit which is connected to a control circuit, such that the actual value of the DC voltage $U_{DC,4}$ present on the DC output of the AC/DC converter approaches the desired DC operating voltage $U_{DC,Soll}$.

6. The method as claimed in claim 4, wherein the exchange of the reactive power $Q_1(t)$ or the exchange of the further reactive power $Q_2(t)$, or both, generates a variation in the amplitude $\hat{U}_4$ on the AC input of the AC/DC converter of at least 10% in relation to a nominal value of the amplitude $\hat{U}_4$.

7. The method as claimed in claim 4, wherein the exchange of the further reactive power $Q_2(t)$ comprises determining a reactive power target value, based upon a known voltage variation characteristic u(Q) as a function of a reactive power Q exchanged between the AC input of the AC/DC converter and the grid connection point of the AC grid.

8. The method as claimed in claim 1, wherein the exchange of the reactive power $Q_1(t)$ comprises determining a reactive power target value, based upon a known voltage variation characteristic u(Q) as a function of a reactive power Q exchanged between the AC input of the AC/DC converter and the grid connection point of the AC grid.

9. The method as claimed in claim 1, further comprising:
    detecting an actual value of a DC voltage $U_{DC,4}$ present on the DC output of the AC/DC converter;
    comparing the detected actual value with the desired DC operating voltage $U_{DC,Soll}$; and
    regulating an exchange of the reactive power $Q_1(t)$ using a regulating circuit which is connected to a control circuit, such that the actual value of the DC voltage $U_{DC,4}$ present on the DC output of the AC/DC converter approaches the desired DC operating voltage $U_{DC,Soll}$.

10. The method as claimed in claim 1 wherein, under specified marginal conditions, and during a state of the AC grid in which an amplitude $\hat{U}_7$ of the AC voltage on the AC rectifier input deviates from its nominal value, executing an exchange of a third reactive power $Q_3(t)$ between the AC/DC converter and the AC grid, such that a resulting effect on the amplitude $\hat{U}_7$ of the AC voltage on the AC rectifier input counteracts a deviation thereof from its nominal value.

11. The method as claimed in claim 1, wherein the exchange of the reactive power $Q_1(t)$ between the AC/DC converter and the AC grid is only executed when the desired DC operating voltage $U_{DC,soll}$, in addition to the value of the amplitude $\hat{U}_4$, also undershoots an average rectified value of the AC voltage at the amplitude $\hat{U}_4$.

12. An actively-controlled rectifier circuit configured to supply a DC load from an AC grid having an AC voltage, comprising:
    an AC rectifier input comprising a plurality of input terminals configured to connect to the AC grid, and a DC rectifier output comprising two output terminals configured to connect to the DC load,
    an AC/DC converter comprising an AC-side AC input that is connected to the AC rectifier input, a DC-side DC output that is connected to the DC rectifier output, and a converter circuit arranged between the AC-side AC input and the DC-side DC output, wherein the converter circuit of the AC/DC converter comprises actively controllable semiconductor switches and freewheeling diodes connected in an antiparallel arrangement thereto, and
    wherein the AC/DC converter is configured for an exchange of reactive power $Q_1(t)$ with the AC grid, and
    wherein the actively-controlled rectifier circuit further comprises a control circuit configured to control the semiconductor switches of the AC/DC converter,
    wherein the actively-controlled rectifier circuit is configured to:
        set a desired DC operating voltage $U_{DC,Soll}$ on the DC-side DC output of the AC/DC converter or on the DC rectifier output, or both, by an actuation of semiconductor switches of the AC/DC converter,
        wherein, when the desired DC operating voltage $U_{DC,Soll}$ lies below a value of an amplitude $\hat{U}_4$ of the AC voltage on the AC-side AC input of the AC/DC converter, the semiconductor switches of the AC/DC converter are actuated for an exchange of reactive power $Q_1(t)$ with the AC grid, which has a voltage-lowering effect upon the amplitude $\hat{U}_4$ of the AC voltage at the AC input of the AC/DC converter, such that the amplitude $\hat{U}_4$ approaches the desired DC operating voltage $U_{DC,Soll}$, and
        wherein the exchange of the reactive power $Q_1(t)$ with the AC grid is executed during or shortly before an electrical connection or an electrical isolation of the DC load to or from the rectifier circuit.

13. The rectifier circuit as claimed in claim 12, wherein the rectifier circuit comprises a regulating circuit configured to detect a DC voltage $U_{DC,4}$ present on the DC output of the AC/DC converter or on the DC rectifier output, or both, to compare the detected DC voltage $U_{DC,4}$ with the desired DC operating voltage $U_{DC,Soll}$ and, in conjunction with the control circuit, to control the AC/DC converter such that the detected DC voltage $U_{DC,4}$ approaches the desired DC operating voltage $U_{DC,Soll}$.

14. The rectifier circuit as claimed in claim 12, wherein the control circuit comprises a data memory, or is connected to a data memory, which is configured to save therein a voltage variation characteristic u(Q) as a function of a reactive power Q.

15. The rectifier circuit as claimed in claim 12, wherein the rectifier circuit additionally comprises a filter circuit comprising a filter reactor, wherein an impedance of the filter reactor is rated such that, in the event of a nominal current flow $I_0$ in the filter reactor, a voltage drop of at least 25% relative to the AC voltage $U_7$ present at the AC rectifier input is generated.

16. The rectifier circuit as claimed in claim 12, wherein the rectifier circuit comprises a single-stage rectifier that includes the AC/DC converter, and does not include a DC/DC converter between the AC/DC converter and the DC rectifier output.

17. An electrolysis system having a rectifier circuit as claimed in claim 12 and an electrolyzer as a DC load, connected to the rectifier circuit on an output side thereof.

18. The electrolysis system as claimed in claim 17, further comprising a transformer that is connected at its secondary side to the AC rectifier input and, at its primary side, is connected to the AC grid via a grid connection point.

19. The electrolysis system as claimed in claim 18, further comprising a reactive power compensating installation for a reduction of any reaction on the AC grid, which is connected to the AC grid at the primary side of the transformer, and functions as a sink for the reactive power $Q_1(t)$ or a further reactive power $Q_2(t)$, or both, exchanged by the AC/DC converter with the AC grid.

20. The electrolysis system as claimed in claim 17, wherein the rectifier circuit comprises a single-stage rectifier that includes the AC/DC converter, and does not include a DC/DC converter between the AC/DC converter and the DC rectifier output.

* * * * *